United States Patent
van Kessel et al.

(10) Patent No.: US 12,100,128 B2
(45) Date of Patent: Sep. 24, 2024

(54) COMPUTER ANALYSIS OF REMOTELY DETECTED IMAGES FOR IMAGE IDENTIFICATION

(71) Applicant: International Business Machines Corporation, Armonk, NY (US)

(72) Inventors: Theodore G. van Kessel, Millbrook, NY (US); Siyuan Lu, Belmont, CA (US); Wang Zhou, White Plains, NY (US); Jayant R. Kalagnanam, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 311 days.

(21) Appl. No.: 17/654,687

(22) Filed: Mar. 14, 2022

(65) Prior Publication Data
US 2023/0289940 A1 Sep. 14, 2023

(51) Int. Cl.
*G06T 7/00* (2017.01)
(52) U.S. Cl.
CPC ...... *G06T 7/00* (2013.01); *G06T 2207/10044* (2013.01); *G06T 2207/20104* (2013.01); *G06T 2207/30242* (2013.01)
(58) Field of Classification Search
CPC . G06T 7/00; G06T 2207/10044; G01S 7/411; G01S 13/9076
See application file for complete search history.

(56) References Cited

U.S. PATENT DOCUMENTS

| 5,276,449 A | 1/1994 | Walsh |
| 10,088,555 B2 | 10/2018 | Bretschneider |

(Continued)

FOREIGN PATENT DOCUMENTS

| CN | 1758070 A | * | 4/2006 |
| CN | 102628935 B | * | 10/2013 |

(Continued)

OTHER PUBLICATIONS

S. Cohen and Z. Zalevsky, "Usage of amplitude, phase and polarization readout for sub-pixel resolution in RADAR images," 2013 IEEE International Conference on Microwaves, Communications, Antennas and Electronic Systems (COMCAS 2013), Tel Aviv, Israel, 2013, pp. 1-4, doi: 10.1109/COMCAS.2013.6685233. (Year: 2013).*

(Continued)

*Primary Examiner* — Michael Robert Cammarata
(74) *Attorney, Agent, or Firm* — Joseph P. Curcuru

(57) ABSTRACT

In an approach to improve detecting and identifying objects through orbital synthetic aperture radar satellites, embodiments arrange an array of elements in a predetermined configuration, and process, by a threshold and signature analysis, detected peaks in processed image data. Further, embodiments generate a list of objects detections based on the processed peaks, and identify an object based on amplitude, polarization ratio, and polarization phase difference. Additionally, embodiments classify the identified object based on the generated list of objects, and output, by a user interface, a list of probable object detections with position coordinates and identifications based on the classified identified objects, wherein the list of probable objects are above or within a predetermine threshold of confidence.

20 Claims, 8 Drawing Sheets

(56) References Cited

U.S. PATENT DOCUMENTS

| | | | |
|---|---|---|---|
| 10,107,904 B2 | 10/2018 | Reis | |
| 10,254,399 B1 | 4/2019 | Simonson | |
| 10,436,897 B2* | 10/2019 | Ranney | G01S 7/025 |
| 10,613,214 B2 | 4/2020 | Soofi | |
| 10,705,187 B1* | 7/2020 | Hebert | F41J 2/00 |
| 10,788,587 B2 | 9/2020 | Dammert | |
| 11,822,007 B2* | 11/2023 | Novoselsky | G01S 7/417 |
| 2007/0030551 A1* | 2/2007 | Oka | G01J 4/04 |
| | | | 359/239 |
| 2009/0102704 A1 | 4/2009 | Fujimura | |
| 2009/0102705 A1* | 4/2009 | Obermeyer | G01S 13/9029 |
| | | | 343/705 |
| 2014/0015710 A1 | 1/2014 | Jin | |
| 2015/0145711 A1* | 5/2015 | Maddox | G01S 13/931 |
| | | | 342/27 |
| 2015/0331097 A1* | 11/2015 | Hellsten | G01S 13/02 |
| | | | 342/25 F |
| 2018/0335518 A1 | 11/2018 | Fox | |
| 2019/0072665 A1 | 3/2019 | Wang | |
| 2019/0271765 A1* | 9/2019 | Ben Khadhra | G01S 7/025 |
| 2020/0025868 A1* | 1/2020 | Trummer | G01S 13/42 |
| 2020/0072764 A1* | 3/2020 | Vacanti | G01N 22/00 |
| 2020/0166636 A1* | 5/2020 | Mihajlovic | G01S 7/411 |
| 2020/0194887 A1* | 6/2020 | Necsoiu | H01Q 3/2647 |
| 2020/0264300 A1 | 8/2020 | Rostami | |
| 2021/0109209 A1* | 4/2021 | Li | G01S 13/9027 |
| 2023/0213648 A1* | 7/2023 | Ray | G01S 13/9029 |
| | | | 342/25 A |

FOREIGN PATENT DOCUMENTS

| | | | | |
|---|---|---|---|---|
| CN | 109359525 A | * | 2/2019 | G06K 9/0063 |
| CN | 110223311 A | * | 9/2019 | |
| WO | 2018236215 A1 | | 12/2018 | |

OTHER PUBLICATIONS

M. Satake et al., "Development of polarization selective corner reflectors . . . airborne polarimetric synthetic aperture radar," IGARSS 2001. Scanning the Present and Resolving Future. Proc. IEEE 2001 Int'l Geo. and Remote Sensing Sym. (Cat. No. 01CH37217), Sydney, Aus., 2001, pp. 417-419 vol. 1, (Year: 2001).*

Bird, Dudley. "Design and manufacture of a low-profile radar retro-reflector." NATO RTO SCI Symposium on Sensors and Sensor Denial by Camouflage, Concealment and Deception (RTO-MP-SCI-145). Brussels, Belgium. 2004. (Year: 2004).*

D. Hounam and K. . -H. Wagel, "A technique for the identification and localization of SAR targets using encoding transponders," in IEEE Transactions on Geoscience and Remote Sensing, vol. 39, No. 1, pp. 3-7, Jan. 2001, doi: 10.1109/36.898660. (Year: 2001).*

J. A. Vitaz, A. M. Buerkle and K. Sarabandi, "Tracking of Metallic Objects Using a Retro-Reflective Array at 26 GHz," in IEEE Transactions on Antennas and Propagation, vol. 58, No. 11, pp. 3539-3544, Nov. 2010, doi: 10.1109/TAP.2010.2071350. (Year: 2010).*

L. M. Novak, M. C. Burl and W. W. Irving, "Optimal polarimetric processing for enhanced target detection," in IEEE Transactions on Aerospace and Electronic Systems, vol. 29, No. 1, pp. 234-244, Jan. 1993, doi: 10.1109/7.249129. (Year: 1993).*

C. Elachi, T. Bicknell, R. L. Jordan and Chialin Wu, "Spaceborne synthetic-aperture imaging radars: Applications, techniques, and technology," in Proceedings of the IEEE, vol. 70, No. 10, pp. 1174-1209, Oct. 1982, doi: 10.1109/PROC.1982.12448 (Year: 1982).*

A. Moreira, P. Prats-Iraola, M. Younis, G. Krieger, I. Hajnsek and K. P. Papathanassiou, "A tutorial on synthetic aperture radar," in IEEE Geoscience and Remote Sensing Magazine, vol. 1, No. 1, pp. 6-43, Mar. 2013, doi: 10.1109/MGRS.2013.2248301. (Year: 2013).*

L. Zhang et al., "Comparison of methods for target detection and applications using polarimetric SAR image," PIERS Online 4(1), 140-145 (2008), http://dx.doi.org/10.2529/PIERS070907024917. (Year: 2008).*

A. G. Mullissa, C. Persello and A. Stein, "PolSARNet: A Deep Fully Convolutional Network for Polarimetric SAR Image Classification," in IEEE Journal of Selected Topics in Applied Earth Observations and Remote Sensing, vol. 12, No. 12, pp. 5300-5309, Dec. 2019, doi: 10.1109/JSTARS.2019.2956650. (Year: 2019).*

The Int'l Archives of the Photogrammetry, Remote Sensing and Spatial Info Sciences, vol. XLII-5. 2018 ISPRS TC V Mid-term Symp. "Geospatial Technology—Pixel to People", Nov. 20-23, 2018; Dehradun, India, pp. 637-642. (Year: 2018).*

Ang, et al., "A Passive Redirecting Van Atta-Type Reflector", IEEE Antennas and Wireless Propagation Letters, vol. 17, No. 4, Apr. 2018, pp. 689-692, <https://ieeexplore.ieee.org/document/8309376>.

Appel-Hansen, J., "A Van Atta reflector consisting of half-wave dipoles", IEEE Transactions on Antennas and Propagation, vol. 14, Issue: 6, Nov. 1966, pp. 694-700, <https://ieeexplore.ieee.org/document/1138780>.

Bird, Dudley, "Design and Manufacture of a Low-Profile Radar Retro-Reflector", Thales Communications UK, RTO-MP-SCI-145, Dec. 1, 2005, 39 pages, <https://apps.dtic.mil/dtic/tr/fulltext/u2/a456839.pdf>.

Bozso, et al., "Benchmark of C-band Radar Corner Reflector based on Sentinel-1 SAR Images. First Results in the Monitoring of the Dunaszekcsö Landslide (Hungary) using Corner Reflectors.", Conference: EGU Generaly Assembly 2018, Poster, Apr. 2018, 2 pages, <https://www.researchgate.net/publication/331563561_Benchmark_of_C-band_Radar_Corner_Reflector_based_on_Sentinel-1_SAR_Images_First_Results_in_the_Monitoring_of_the_Dunaszekcso_Landslide_Hungary_using_Corner_Reflectors>.

Braaten, et al., "A Compact Printed Van Atta Array with Zero-Phase CRLH Transmission Lines", 2015 IEEE International Symposium on Antennas and Propagation & USNC/URSI National Radio Science Meeting, Jul. 2015, pp. 1856-1857, <https://ieeexplore.ieee.org/document/7305317>.

Garthwaite, et al., "Corner Reflectors for the Australian Geophysical Observing System and Support for Calibration of Satellite-Borne Synthetic Aperture Radars", IEEE International Symposium on Geoscience and Remote Sensing (IGARSS), Jul. 2013, pp. 266-269, <https://ieeexplore.ieee.org/document/6721143>.

Guo, et al., "Retrodirective Array Technology", Progress In Electromagnetics Research B, vol. 5, 2008, pp. 153-167, <https://www.jpier.org/PIERB/pierb05/10.08021704.pdf>.

He, et al., "Polarization properties of a corner-cube retroreflector with three-dimensional polarization ray-tracing calculus", Applied Optics, vol. 52, No. 19, Jul. 1, 2013, pp. 4527-4535, <https://www.researchgate.net/publication/248396501_Polarization_properties_of_a_corner-cube_retroreflector_with_three-dimensional_polarization_ray-tracing_calculus>.

Larsen, Tove, "A Theoretical Investigation of Van Atta Arrays", Technical Univ of Denmark Lyngby, Laboratory of Electromagnetic Theory, Scientific Report No. 1 S127 R39, 39 pages, <https://apps.dtic.mil/sti/citations/AD0613614>.

Latmiral, et al., "Radar Corner Reflectors for Linear or Circular Polarization", Journal of Research of the National Bureau of Standards, D. Radio Propagation, vol. 66D, No. I., Jan.-Feb. 1962, pp. 23-29, <https://nvlpubs.nist.gov/nistpubs/jres/66D/jresv66Dn1p23_A1b.pdf>.

Liu, et al., "Polarization properties of corner-cube retroreflectors: theory and experiment", Applied Optics, vol. 36, No. 7, Mar. 1, 1997, pp. 1553-1559, <https://www.researchgate.net/publication/5601156_Polarization_properties_of_corner-cube_retroreflectors_Theory_and_experiment>.

Minvielle, et al., "Fast 3D Synthetic Aperture Radar Imaging from Polarization-Diverse Measurements", arXiv:1506.07459v1, Jun. 24, 2015, 21 pages.

Numan, et al., "Wide Field of View Retrodirective Millimeter Wave Antenna Array With Pulse Modulation and Orthogonal Polarization States", IEEE Access, vol. 8, 2020, pp. 221127-221137, <https://ieeexplore.ieee.org/document/9288726>.

Pei, et al., "Synthetic Aperture Radar Processing Approach for Simultaneous Target Detection and Image Formation", Sensors 2018, 18, 3377, 13 pages.

(56) References Cited

OTHER PUBLICATIONS

Sharp, et al., "Van Atta reflector array", IRE Transactions on Antennas and Propagation, vol. 8, Issue: 4, Jul. 1960, pp. 436-438, <https://ieeexplore.ieee.org/document/1144877>.

Tseng, et al., "A Planar Van Atta Array Reflector with Retrodirectivity in Both E-Plane and H-Plane", IEEE Transactions on Antennas and Propagation, vol. 48, No. 2, Feb. 2000, pp. 173-175, <https://ieeexplore.ieee.org/document/833066>.

Wolff, Christian, "Corner Reflectors", Radartutorial, Last printed Mar. 11, 2022, 3 pages, <https://www.radartutorial.eu/17.bauteile/bt47.en.html>.

Zhou, et al., "A Retrodirective Antenna Array With Polarization Rotation Property", IEEE Transactions on Antennas and Propagation, vol. 62, No. 8, Aug. 2014, pp. 4081-4088.

Zhu, et al., "Deep Learning Meets SAR", arXiv:2006.10027v2, Jan. 5, 2021, 26 pages.

\* cited by examiner

COMPUTER ANALYSIS OF REMOTELY DETECTED IMAGES FOR IMAGE IDENTIFICATION

BACKGROUND OF THE INVENTION

The present invention relates generally to the field of remotely detecting and identifying objects, and more particularly to remotely detecting and identifying objects through orbital synthetic aperture radar satellites (SAR).

Synthetic-aperture radar (SAR) is a form of radar that is used to create two-dimensional images or three-dimensional reconstructions of objects, such as landscapes. SAR uses the motion of the radar antenna over a target region to provide finer spatial resolution than conventional stationary beam-scanning radars. SAR is typically mounted on a moving platform, such as an aircraft or spacecraft, and has its origins in an advanced form of side looking airborne radar (SLAR). The distance the SAR device travels over a target during the period when the target scene is illuminated creates the large synthetic antenna aperture (the size of the antenna). Typically, the larger the aperture, the higher the image resolution will be, regardless of whether the aperture is physical (a large antenna) or synthetic (a moving antenna)—this enables SAR to create high-resolution images with comparatively small physical antennas. For a fixed antenna size and orientation, objects which are further away remain illuminated longer—therefore SAR has the property of creating larger synthetic apertures for more distant objects, which results in a consistent spatial resolution over a range of viewing distances.

To create a SAR image, successive pulses of radio waves are transmitted to "illuminate" a target scene, and the echo of each pulse is received and recorded. The pulses are transmitted, and the echoes received using a single beam-forming antenna, with wavelengths of a meter down to several millimeters. As the SAR device on board the aircraft or spacecraft moves, the antenna location relative to the target changes with time. Signal processing of the successive recorded radar echoes enables the combining of the recordings from these multiple antenna positions. This process forms the synthetic antenna aperture and enables the creation of higher-resolution images than would otherwise be possible with a given physical antenna. Synthetic aperture radar systems have been developed over the last half century to view earth, and the earth's atmosphere and sea from space. Further, synthetic aperture radar systems enable the observing and detecting of, but not limited to, structures, vegetation, ocean conditions, and cloud cover. The unique properties of radar signals to penetrate clouds and respond to the ground and sea enable observations that complement observations in other electromagnetic bands.

SUMMARY

Embodiments of the present invention disclose a computer-implemented method, an apparatus, and an apparatus for remotely detecting and identifying objects through orbital synthetic aperture radar satellites, the computer-implemented method comprising: arranging an array of elements in a predetermined configuration; processing, by a threshold and signature analysis, detected peaks in processed image data; generating a list of objects detections based on the processed peaks; identifying an object based on amplitude, polarization ratio, and polarization phase difference; classifying the identified object based on the generated list of objects; and outputting, by a user interface, a list of probable object detections with position coordinates and identifications based on the classified identified objects, wherein the list of probable objects are above or within a predetermine threshold of confidence.

DETAILED DESCRIPTION

Embodiments of the present invention utilizes radar properties to identify objects that are not otherwise detectable or separable from other objects by other means of observation. Alternatively, embodiments of the present inventions provide a secondary means of identification of remotely observed objects. Embodiments of the present invention recognize that currently in the art it is commonplace to equip various modes of transportation and objects (e.g., boats, trains, aircraft, motor vehicles, shipping containers, buildings, and infrastructure) with transponders and cellular global positioning system (GPS) locating devices to enable companies, governments and individuals to track and monitor the locations of these objects and modes of transportation. In some cases, cost or the environment will not permit the use of equipping transportations means and objects with transponders and cellular GPS locating devices. In other cases, GPS equipment fails, or the objects are located in areas without cellular coverage.

Embodiments of the present invention improve the art and solve the particular problems stated above by using a retro directive apparatus to enable the object to be visible to synthetic aperture radar in manor that enables both the location of the object and identification of the object to take place. Further, embodiments of the present invention improve the art and solve at least the issues stated above by enabling the affixation of objects on the ground or sea with retro directive assemblies of elements or arrays such that a radar signal from an orbiting or airborne synthetic aperture radar system is reflected back from the object to the SAR receiver with its polarization and amplitude altered (encoded) to enable both identification of the object and estimation of its location using a radar image processing algorithm. Embodiments of the present invention comprise an assembly that can be constructed of multiple retro directive elements and affixed to an object to achieve a desired radar return signal that has specific encoded polarization and amplitude properties to an orbiting or airborne SAR radar and a method to locate and classify said signal in SAR radar images.

Implementation of embodiments of the invention may take a variety of forms, and exemplary implementation details are discussed subsequently with reference to the Figures (i.e., FIG. 1A-FIG. 9).

Figure 1A:
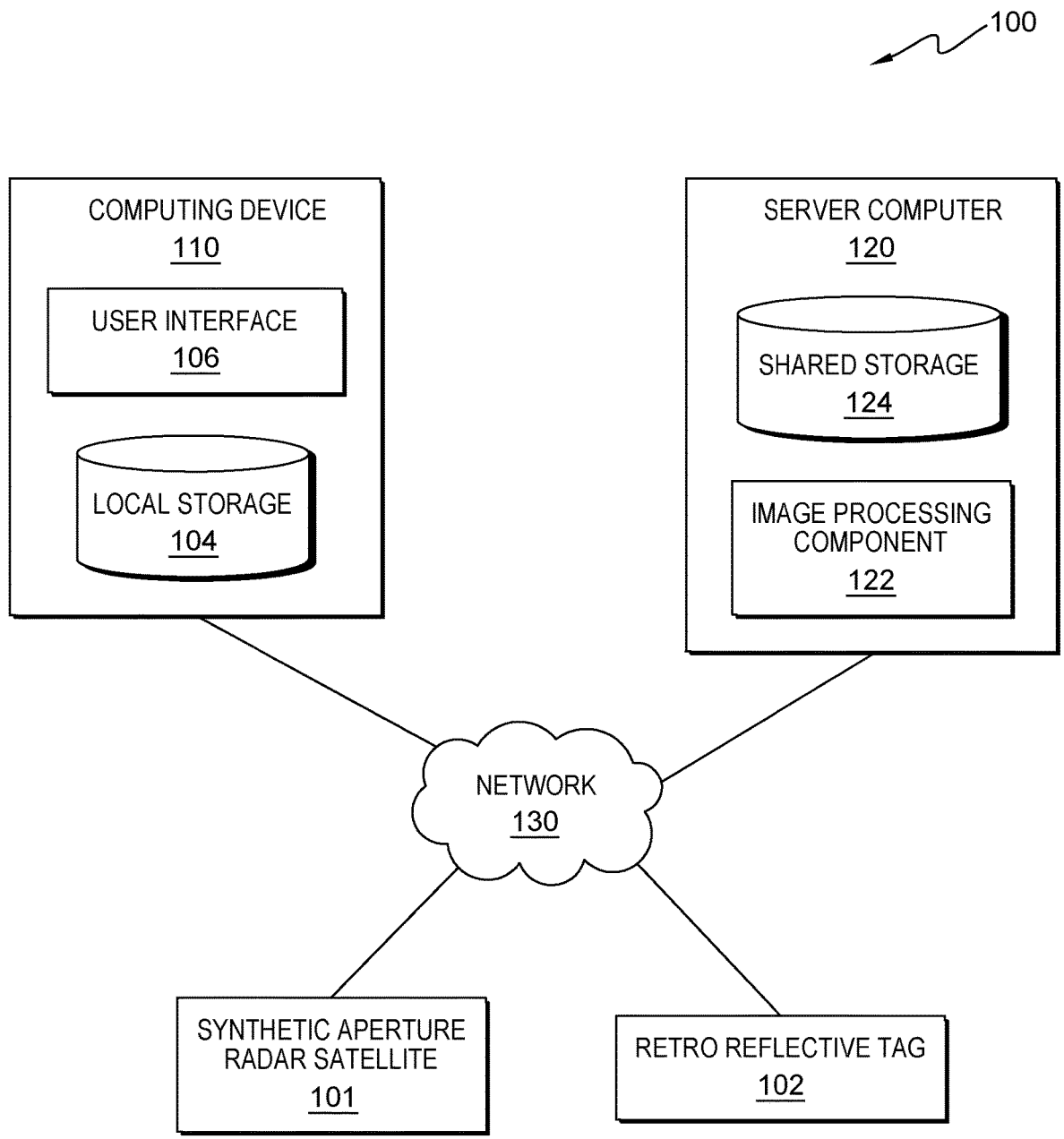
FIG. 1A is a functional block diagram illustrating a distributed data processing environment, in accordance with an embodiment of the present invention.

FIG. 1A is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1A provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110, synthetic aperture radar (SAR) satellite 101, retro reflective tag 102, and server computer 120 interconnected over network 130.

Network 130 may be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and may include wired, wireless, or fiber optic connections. Network 130 may include one or more wired and/or wireless networks that may receive and transmit data, voice, and/or video signals, including multimedia signals that include voice, data, text and/or video data. In general, network 130 may be any combination of connections and protocols that will support communications between computing device 110 and server computer 120, and any other computing devices and/or storage devices (not shown in FIG. 1A) within distributed data processing environment 100.

In some embodiments of the present invention, computing device 110 may be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), AR glasses, a virtual reality headset, any HUD known in the art, and/or any programmable electronic computing device capable of communicating with various components and devices within distributed data processing environment 100, via network 130 or any combination therein. In general, computing device 110 may be representative of any programmable computing device or a combination of programmable computing devices capable of executing machine-readable program instructions and communicating with users of other computing devices via network 130 and/or capable of executing machine-readable program instructions and communicating with server computer 120. In some embodiments computing device 110 may represent a plurality of computing devices.

In some embodiments of the present invention, computing device 110 may represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. Computing device 110 may include an instance of user interface (interface) 106, and local storage 104. In various embodiments, not depicted in FIG. 1A, computing device 110 may have a plurality of interfaces 106. In other embodiments, not depicted in FIG. 1A, distributed data processing environment 100 may comprise a plurality of computing devices, plurality of server computers, and/or one a plurality of networks. Computing device 110 may include internal and external hardware components, as depicted, and described in further detail with respect to FIG. 9.

User interface (interface) 106 provides an interface to image processing component (component) 122. Computing device 110, via user interface 106, may enable a user and/or a client to interact with component 122 and/or server computer 120 in various ways, such as sending program instructions, receiving program instructions, sending and/or receiving messages, updating data, sending data, inputting data, editing data, collecting data, and/or receiving data. In one embodiment, interface 106 may be a graphical user interface (GUI) or a web user interface (WUI) and may display at least text, documents, web browser windows, user options, application interfaces, and instructions for operation. interface 106 may include data (such as graphic, text, and sound) presented to a user and control sequences the user employs to control operations. In another embodiment, interface 106 may be a mobile application software providing an interface between a user of computing device 110 and server computer 120. Mobile application software, or an "app," may be designed to run on smart phones, tablet computers and other computing devices. In an embodiment, interface 106 may enable the user of computing device 110 to at least send data, input data, edit data (annotations), collect data and/or receive data.

SAR satellite 101 is a form of radar that is used to create two-dimensional images or three-dimensional reconstructions of objects, such as landscapes. In various embodiments. SAR satellite 101 uses the motion of the radar antenna over a target region to provide finer spatial resolution than conventional stationary beam-scanning radars. SAR satellite 101 may send and/or receive transmission/transmitted signals as they are known and understood in the art. In various embodiments, component 122 receives transmission/transmitted signals and/or image data from SAR satellite 101, wherein component 122 processes the received data and outputs an image, identification label, and location of one or more objects described in the received data.

Retro reflective tag 102 is a device, surface, or material that reflects radiation (usually light) back to its source with minimum scattering. In various embodiments, retro reflective tag 102 returns the radar emitted by SAR satellite 101 back to SAR satellite 101, wherein the returned radar signal comprises object data. The object data comprises, metadata, imaging data, object parameters, object location, and/or other object data known and understood in the art.

Server computer 120 may be a standalone computing device, a management server, a web server, a mobile computing device, one or more client servers, or any other electronic device or computing system capable of receiving, sending, and processing data. In other embodiments, server computer 120 may represent a server computing system utilizing multiple computers such as, but not limited to, a server system, such as in a cloud computing environment. In another embodiment, server computer 120 may represent a computing system utilizing clustered computers and components (e.g., database server computers, application server computers, etc.) that act as a single pool of seamless resources when accessed within distributed data processing environment 100. Server computer 120 may include internal and external hardware components, as depicted, and described in further detail with respect to FIG. 9. In some embodiments server computer 120 may represent a plurality of server computers.

Each of shared storage 124 and local storage 104 may be a data/knowledge repository and/or a database that may be written and/or read by one or a combination of component 122, server computer 120 and computing device 110. In some embodiments, each of shared storage 124 and local storage 104 may be a data/knowledge repository, a knowledge base, a knowledge center, a knowledge corpus, and/or a database that may be written and/or read by one or a combination of component 122, server computer 120 and computing device 110. In the depicted embodiment, shared storage 124 resides on server computer 120 and local storage 104 resides on computing device 110. In another embodiment, shared storage 124 and/or local storage 104 may reside elsewhere within distributed data processing environment 100, provided that each may access and is accessible by computing device 110 and server computer 120. Shared storage 124 and/or local storage 104 may each be implemented with any type of storage device capable of storing data and configuration files that may be accessed and utilized by server computer 120, such as, but not limited to, a database server, a hard disk drive, or a flash memory. In various embodiments, not depicted in FIG. 1A, in addition to shared storage 124, server computer comprises a primary and a secondary database, described below in FIG. 9. The primary database, also referred to as primary storage device, may be one or more of any type of disk storage known in the art. The secondary database, also referred to as secondary storage device, may be one or more any type of tape storage known in the art.

In the depicted embodiment, component 122 is executed on server computer 120. In other embodiments, component 122 may be executed on computing device 110. In various embodiments of the present invention, not depicted in FIG. 1A, component 122 may execute on a plurality of server computers 120 and/or on a plurality of computing devices 110. In some embodiments, component 122 may be located and/or executed anywhere within distributed data processing environment 100 as long as component 122 is connected to and/or communicates with, computing device 110, and/or server computer 120, via network 130.

In various embodiments, component 122 comprises a radar retro directive assembly (RDA) typically arranged as an array of elements affixed to an object that modifies the amplitude and phase of a retro directed signal from a synthetic aperture radar (SAR) system such that identification of the object is possible in synthetic aperture radar images using an image processing algorithm. It should be noted that the terms "retro directive" and "retro reflective" are often used interchangeably. The term "retro directive" refers to a device or object that interacts with incident radar radiation and causes a portion of this radiation to be retro directed or retro reflected back along the path it came with modification to its polarization and amplitude.

In various embodiments, not depicted in FIG. 1A, component 122 comprises a radar retro directive assembly typically arranged as an array of elements affixed to an object that modifies the amplitude and phase of a retro directed signal from a SAR system (e.g., SAR satellite such that identification of an object based on SAR images from the SAR system using an image processing algorithm, wherein the elements of said retro directive assembly comprise one or more retro directive elements, wherein the array where said retro directive elements is arranged with multiple out of plane elements to modify the average phase of the return signal to said SAR system, wherein the retro directive elements are implemented as corner cube reflectors, and wherein the said retro directive elements are implemented as van Atta type retro directive elements. Further, component 122 may identify one or more objects through the image processing algorithm, wherein the image processing algorithm may comprise the steps of: (i) ingesting one or more of radar images containing a region of interest (e.g., horizontal transmit and horizontal receive (HH), vertical transmit and vertical receive (VV), horizontal transmit and vertical receive (HV), and vertical transmit and horizontal receive (VH)), (ii) processing said images to locate and create a list of peak features in the data, (iii) process peak features using threshold and signature analysis to generate list of object detections, (iv) transforming said feature location to latitude, longitude coordinates for each peak, (v) processing the feature list to exclude peak data below thresholds for background in both phase and amplitude, (vi) processing the peak locations in multiple polarization images to determine the polarization ratio to create a list of probable object detections, (vii) classifying the detected objects in the list according to the polarization ratio, and (viii) generating and return a list of probable object detections with position coordinates and identifications.

Figure 1B:
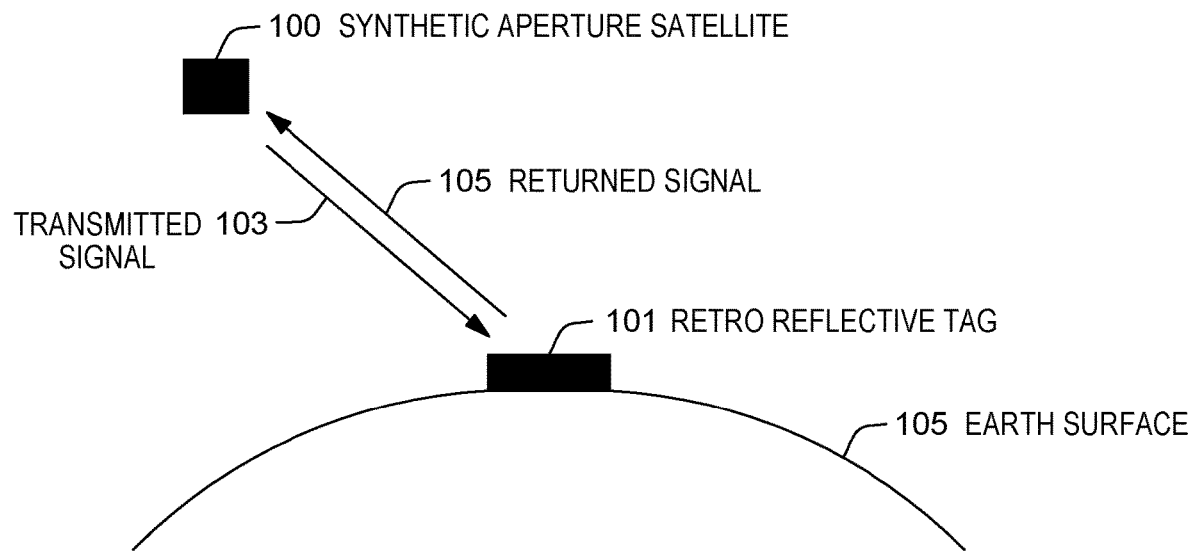
FIG. 1B is a functional block diagram illustrating an exemplary scenario, in accordance with an embodiment of the present invention.

An overall perspective of the system is illustrated in FIG. 1B. FIG. 1B is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1B provides only an illustration of one implementation and does not imply any limitations with regard to the environments in which different embodiments may be implemented. Many modifications to the depicted environment may be made by those skilled in the art without departing from the scope of the invention as recited by the claims.

In FIG. 1B, SAR satellite 101 emits radar frequency signal (transmitted signal) 103 that is incident on the retro directive assembly (e.g., retro reflective tag) 102 affixed to an object or location on earth surface 105. retro reflective tag 102 returns radar signal (returned signal) 105 that is modified in both phase and amplitude. Returned signal 105 is received by SAR satellite 100 where it is recorded along with other proximate SAR data on one or more channels. The data from the satellite is transmitted to earth stations (e.g., server computer 120) where it is processed by component 122 and made available in the form of data images to users, via computing device 110. The SAR data is processed to locate returned signal 105 from retro reflective tag 102 in the SAR data.

In various embodiments, return signal 105 is purposefully large in magnitude relative to the typical SAR return signal from earth. This bright return signal assists in the return signal being located and identified within the clutter and noise produced by preexisting radar images. In various embodiments, the RDA consists of an array of corner reflectors (e.g., trihedral) arranged in a plane. Further, raw SAR data is processed by the operating agency to level 1 and level 2 data with accounting for height, noise and other factors and provided as polarization amplitude data to the user. Level 0 data is reconstructed, unprocessed instrument and payload data at full resolution, with any and all communications artifacts (e.g., synchronization frames, communications headers, duplicate data) removed. Level 1 data is reconstructed, unprocessed instrument data at full resolution, time-referenced, and annotated with ancillary information, including radiometric and geometric calibration coefficients and georeferencing parameters (e.g., platform ephemeris) computed and appended but not applied to Level 0 data. Level 2 data is derived geophysical variables at the same resolution and location as Level 1 source data.

Figure 8:
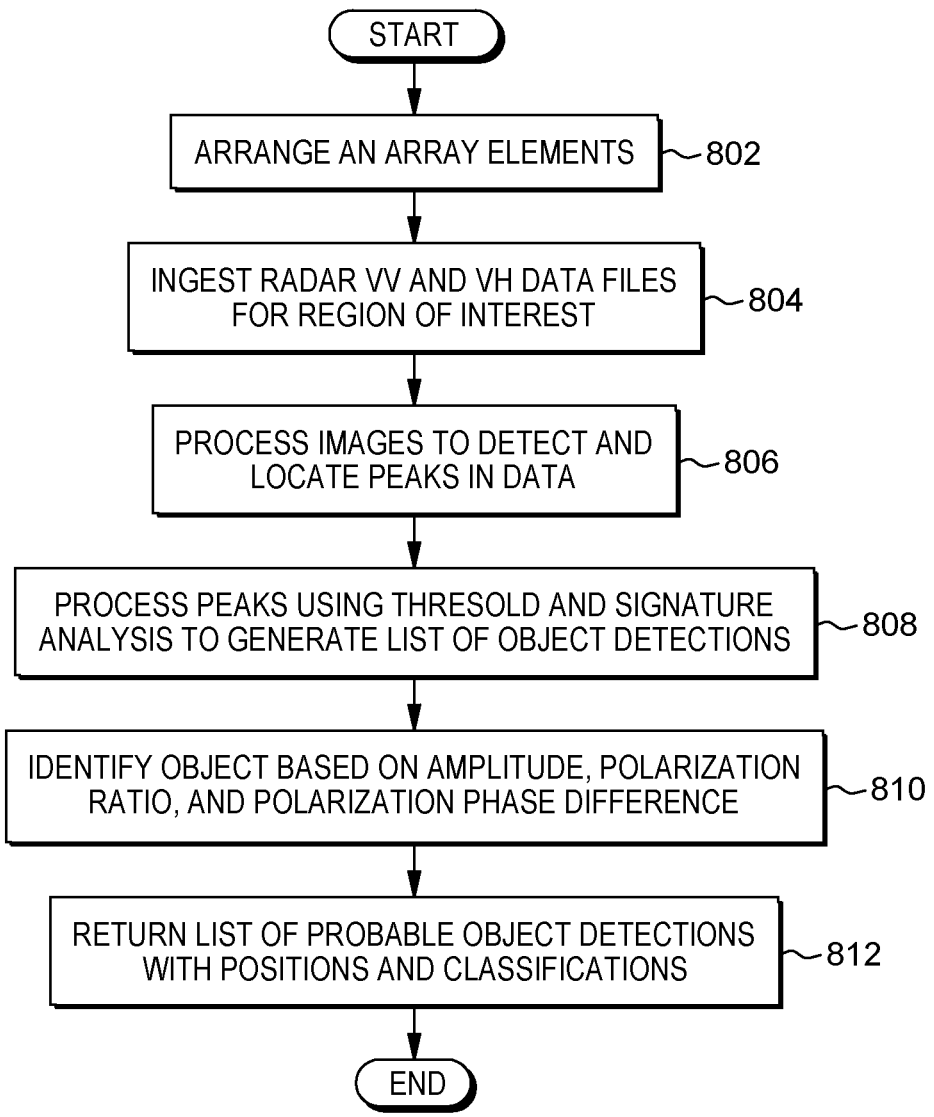
FIG. 8 illustrates operational steps of an image processing component, on a server computer within the distributed data processing environment of FIG. 1A, for remotely detecting and identifying objects through orbital synthetic aperture radar satellites, in accordance with an embodiment of the present invention.

Level 1 data is processed data comprising horizontal transmit and horizontal receive (HH), vertical transmit and vertical receive (VV), horizontal transmit and vertical receive (HV), and vertical transmit and horizontal receive (VH). The vertical and horizontal terms refer to the polarization of the radar signal, wherein this data is provided to the user in the form of netcdf files accessible on the internet. The raw (level 0) data can be used with the additional complexity that distance, cloud attenuation, noise and other factors considered by the user. In various embodiments, the processing data involves at least (i) examining the radar images to create a list of large peaks in the data, (ii) locating the precise position of the peaks in the image, (iii) transforming this location to latitude, longitude coordinates for each peak, (iv) excluding peak data below thresholds for background in both phase and amplitude, (v) processing the peak locations in multiple polarization images to determine the polarization ratio to create a list of probable object detections, (vi) classifying the detected objects in the list according to the polarization ratio, and (vii) returning a list of probable object detections with positions and identifications. These steps are further illustrated in the flow chart below, as shown in FIG. 8.

In various embodiments, component 122 receives a radar signal from an orbiting or airborne synthetic aperture radar (SAR) system, wherein the received radar signal is reflected back from one or more affixed objects to an SAR receiver within the SAR system, and wherein the received radar signal's polarization and amplitude are altered to enable both identification of the object and estimation of the objects location using a radar image processing algorithm.

Figure 2:
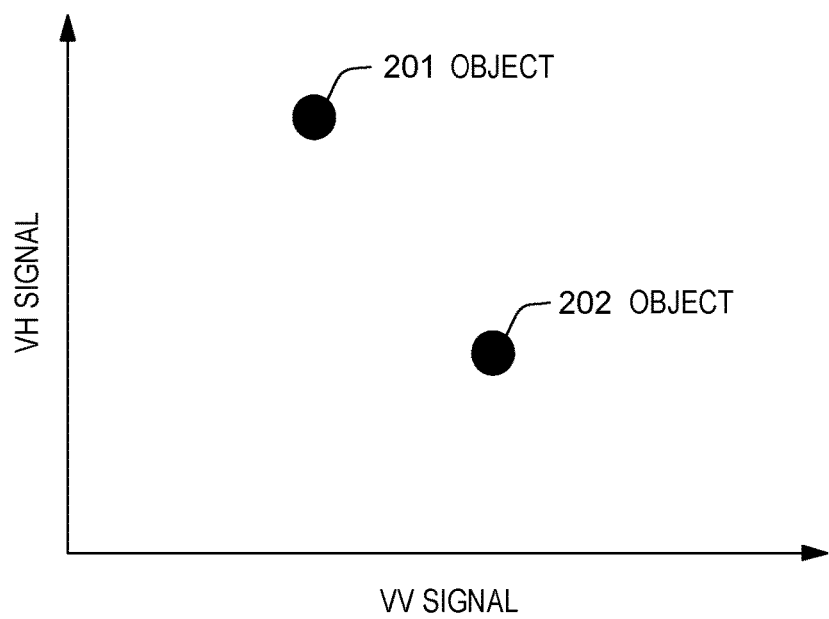
FIG. 2 is a graphical representation, in accordance with an embodiment of the present invention.

FIG. 2 illustrates where processed peak data points from the RDA might lie in the VH versus VV plane. FIG. 2 is an illustration of the relative signal response of distinct tagged objects, in accordance with one embodiment of the present invention. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

The positions on the plane, illustrated on FIG. 2, are used to classify the object detected. In the depicted embodiment, object 201 distinctly relative to object 202 in terms of polarization amplitude ratio. Amplitude provides additional information dimension. In various embodiments, the return amplitude must be larger than the background object to enable the signal to be isolated (see above) and less than the detector limit. Within this band there is additional room for encoding (i.e., alteration) in the form of distance from the detector limit. In the depicted embodiment, considering the available amplitude×phase space, noise, and other variables know in the art, the order of 8 bits worth of information can be communicated and used for identification of the object.

In various embodiments, in the case of large objects, where the dimension of the object exceeds the pixel size of the detector (e.g., 20 meters) multiple encoded retro directive assemblies can be deployed to further add feature space for identification. This takes two forms. In one example, multiple assemblies will add additional bits, using Equation 1, regardless of position as long as they can be distinctly detected.

$$\text{Bits} \sim = \text{bits\_per\_sensor} * \text{number\_of\_sensors} \quad \text{Equation 1}$$

In another example, the physical placement of the sensors on the object enables an additional dimension of encoding. A bar code or a quick response (QR) code is an example of spatial encoding. The combination of amplitude, phase and spatial encoding in this context offer on the order of 16-24 bits of encoding. In other areas of information encoding, some bits are typically used for error detection and recovery. Cyclic redundancy and hash codes are the most common method. Given the inevitable presence of noise error correction codes are desirable. Error correcting codes comprise but are not limited to cyclic redundancy checks, Hadamard code, Walsh-Hadamard codes, Hamming codes and Turbo codes. Given the number of bits available and the relatively small size of the computation, efficiency in terms of information bits used for error detection and correction is most important.

Various methods exist to construct a retro directive array (RDA) capable of modifying both polarization and amplitude that include passive and active methods. In various embodiments, component 122 can construct a retro directive array (RDA) capable of modifying both polarization and amplitude through a passive retroreflective element (e.g., trihedral corner reflector). The trihedral corner reflector is the corner formed by the right-angle intersection of 3 planar conducting plates. Radar signals (electromagnetic waves) incident on the concave portion of the corner cube are reflected off one or more sides of the corner to return in the direction of incidence. The simple corner cube approximately preserves polarization and is efficient in terms of the magnitude of the return signal relative to the incident signal.

In one example, the frequency of the radar signal is 5.405 GHz with a wavelength of 5.547 cm. To be effective at this wavelength, corner cube reflectors must be of an overall dimension that is greater than the wavelength and with a surface smoothness that is less than at least wavelength/8*π. The passive trihedral corner reflector will return a signal with a cross section, described by Equation 2:

$$\sigma = 4 \cdot \pi \cdot a^4 / 3 \cdot \lambda^2 \quad \text{Equation 2}$$

where $\sigma$ represents the cross section, a represents the area of the retro reflector, $\lambda$ represents the wavelength of the radar signal, and $\pi$ represents its known and understood value. The expected signal amplitude of a reflection from a corner reflector is proportional to the cross section. Where a represents the length of the side edges of the three isosceles triangles and λ represents the wavelength of scanning Radar. Radar targets are measured in terms of cross section expressed in decibels per square meter (dBsm). A small trihedral retro reflector with an edge dimension of 0.5 m, might have a cross section on the order of 14.5 $m^2$ (or ~20 dBsm).

Figure 3:
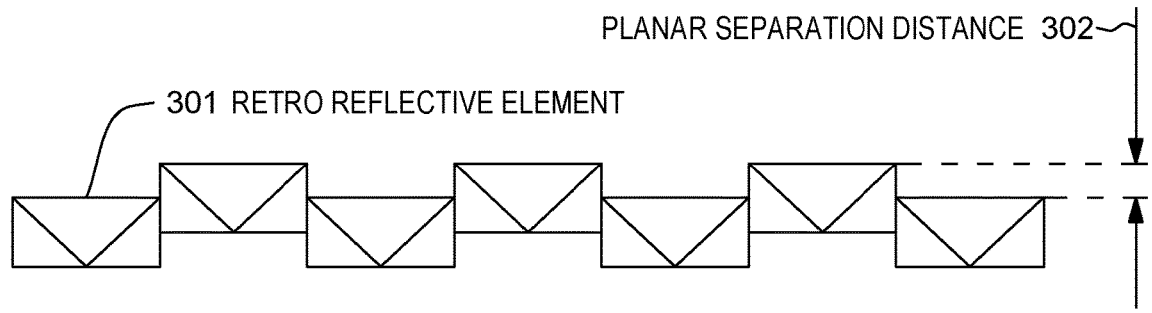
FIG. 3 is a functional block diagram illustrating an exemplary scenario, in accordance with an embodiment of the present invention.

FIG. 3 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

FIG. 3 depicts an example where Level 1 IW-GRD or grid resolution is 20 m×22 m (i.e., the pixel size in the most resolved radar image). If the array comprises multiple retro directive elements 301 that are small in area compared to the pixel size, then multiple retro directive elements 301 are arranged in a plane with staggered offset 302 as shown in FIG. 3. In the depicted embodiment, the average phase of the return signal can be manipulated to alter the apparent polarization ratio discussed above.

Figure 4:
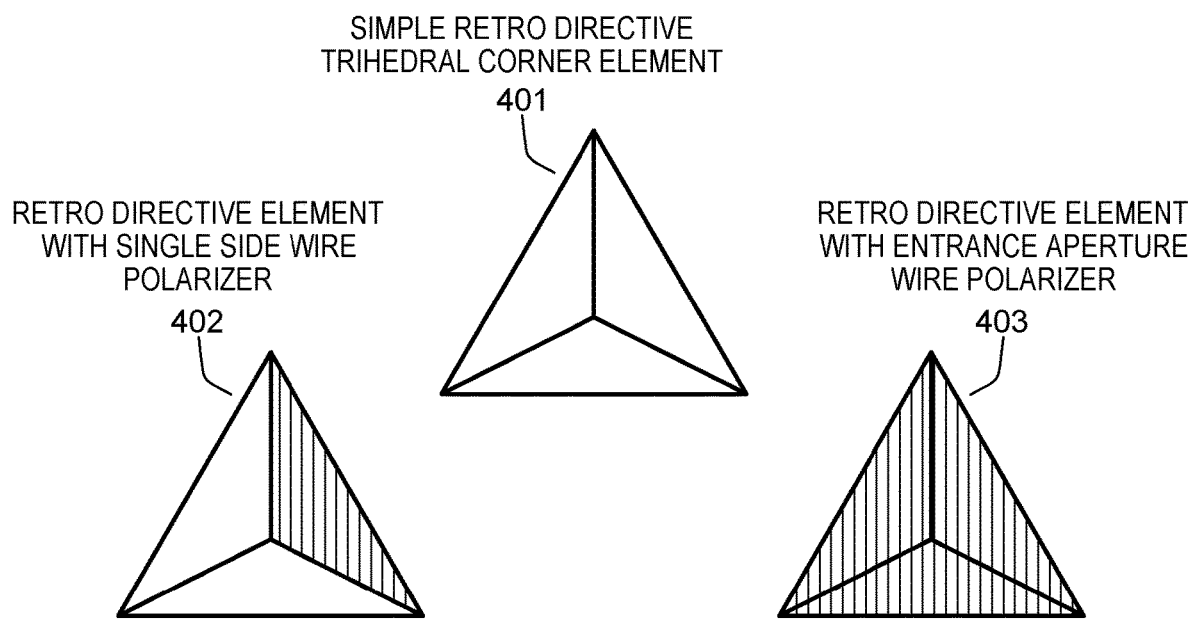
FIG. 4 is a functional block diagram illustrating an exemplary scenario, in accordance with an embodiment of the present invention.

In an alternate embodiment, illustrated in FIG. 4, the polarization content of the return signal of an individual retro reflective element can be modified by adding polarizers in the form of wire arrays in place of one side or in front of the aperture of a trihedral retro directive element, as depicted in FIG. 4. The depicted embodiment comprises retro directive element 401, retro directive element 402, and retro element 403. Retro directive element 401 is a simple trihedral sheet metal corner reflector. This basic arrangement can be altered to more precisely control the polarization beyond what is possible with a simple trihedral.

In the depicted embodiment retro directive element 402 is a simple trihedral sheet metal corner reflector with one of the trihedral sides replaced with a wire array oriented to produce a resultant polarization. Due to reflections in the cube, this is a less desirable solution than an embodiment is shown in retro directive element 403 where the accepted and emitted radiation is limited to a single polarization. This configuration results in some loss of efficiency but is more precise. Retro directive element 403 is a simple trihedral sheet metal corner reflector with an entrance aperture wire polarizer.

An alternative passive array corner cube retroreflector is a van Atta type reflector. This configuration comprises an array of reflective metal antenna surfaces connected by fixed delay conductors. The two-dimensional (2D) van Atta retro reflector comprises an array of antenna patches in which diagonally opposing patches are connected and all connections are of equal length (equal delay), as depicted in FIG. 5.

Figure 5:
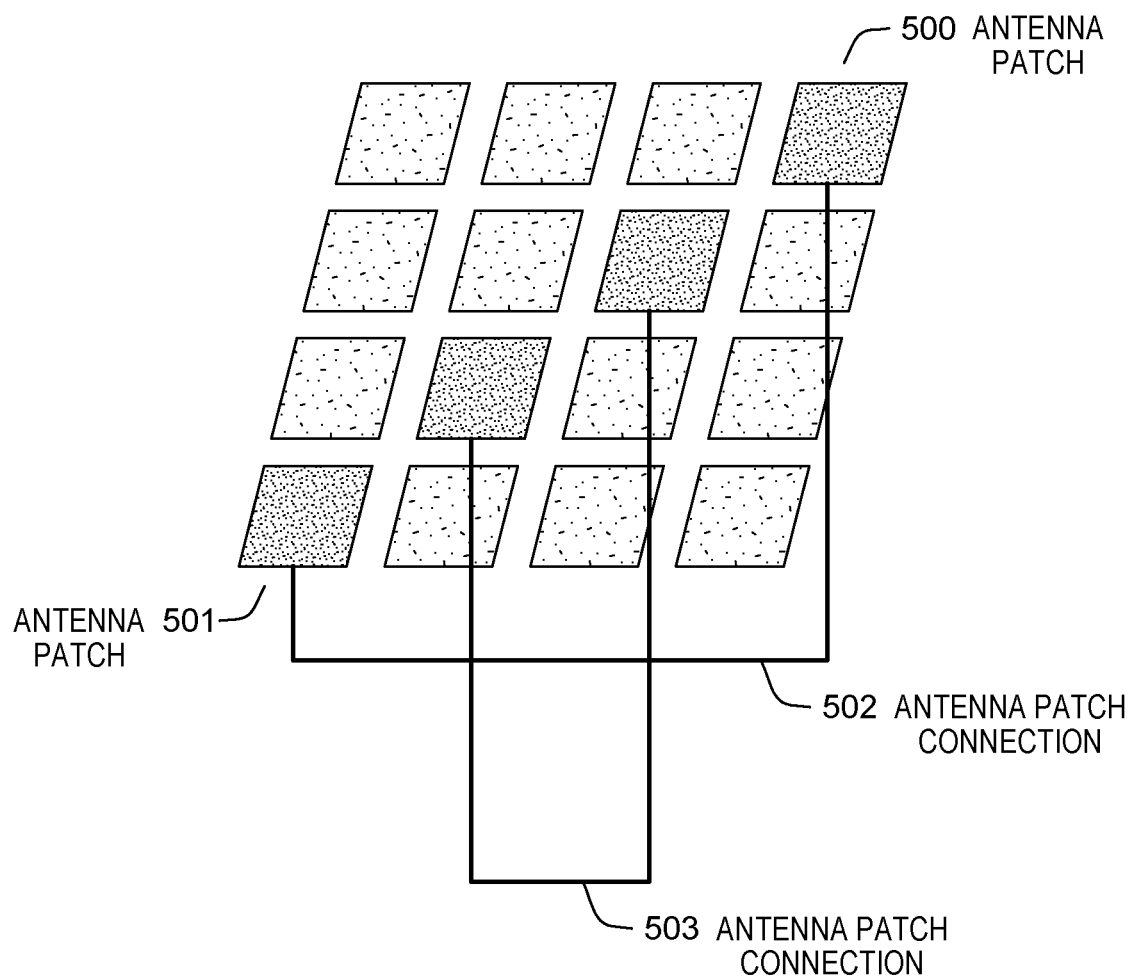
FIG. 5 is a functional block diagram illustrating an exemplary scenario, in accordance with an embodiment of the present invention.

FIG. 5 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 5 provides only an illustration of one implementation and does not imply any limitations with regard to the environments in which different embodiments may be implemented. Many modifications to the depicted environment may be made by those skilled in the art without departing from the scope of the invention as recited by the claims.

FIG. 5 depicts an example of van Atta type retro redirective array showing diagonal equal length connections between antenna patches. In the depicted embodiment, antenna patch 500 is connected to antenna patch 501 by antenna patch connection (connection) 502. Connection 502 is of equal length to antenna patch connection (connection) 503. The remaining patches in the array are similarly connected. In the van Atta configuration, the antenna patches can be optimally spaced between 0.4-0.6 wavelength apart. In one particular example, the patch spacing in the array at half wave would be on the order of 2.77 cm (a little over one inch). The patches (e.g., patch 500 and 501) can be constructed of microstrip and affixed to FR4 like material to construct the interconnections. FR4 is a flame retardant material that is a National Electrical Manufacturers Association (NEMA) grade designation for glass-reinforced epoxy laminate material. More generally, FR-4 material is a composite material composed of woven fiberglass cloth with an epoxy resin binder that is flame resistant. As in the example shown in FIG. 3 above, where multiple van Atta assemblies can be arranged to modify the phase of the retro reflective signal.

In addition to the methods above, the van Atta type retro directive antenna can be modified to alter both phase and amplitude by employing active circuit elements in the connections between patches. In one embodiment, bidirectional radio frequency (rf) amplifiers are added to the patch connections to provide additional antenna gain, as shown in FIG. 6.

Figure 6:
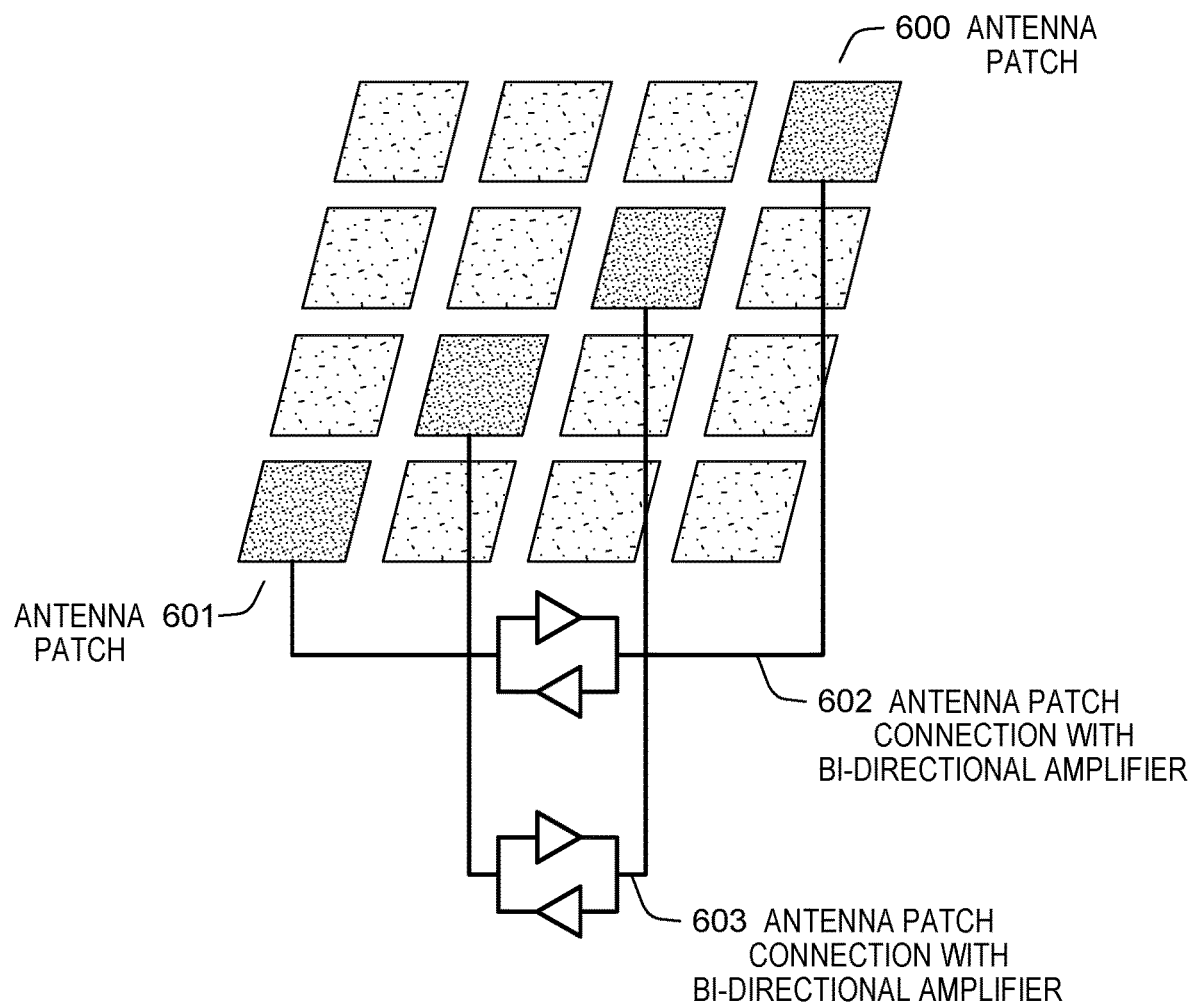
FIG. 6 is a functional block diagram illustrating an exemplary scenario, in accordance with an embodiment of the present invention.

FIG. 6 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 6 provides only an illustration of one implementation and does not imply any limitations with regard to the environments in which different embodiments may be implemented. Many modifications to the depicted environment may be made by those skilled in the art without departing from the scope of the invention as recited by the claims.

FIG. 6 is an example of an active van Atta type retro directive array showing diagonal equal delay connections between antenna patches. In the depicted embodiment, antenna patch 600 is connected to antenna patch 601 by antenna patch connection (connection) 602 and antenna patch connection (connection) 603, wherein connection 602 and 603 each comprise a bi-directional amplifier. As in the passive case the patches are diagonally connected, however, in the depicted embodiment a bidirectional amplifier is inserted into the line. The delay of the bidirectional amplifier and connection line are chosen to be equal for all connections between patches.

Figure 7:
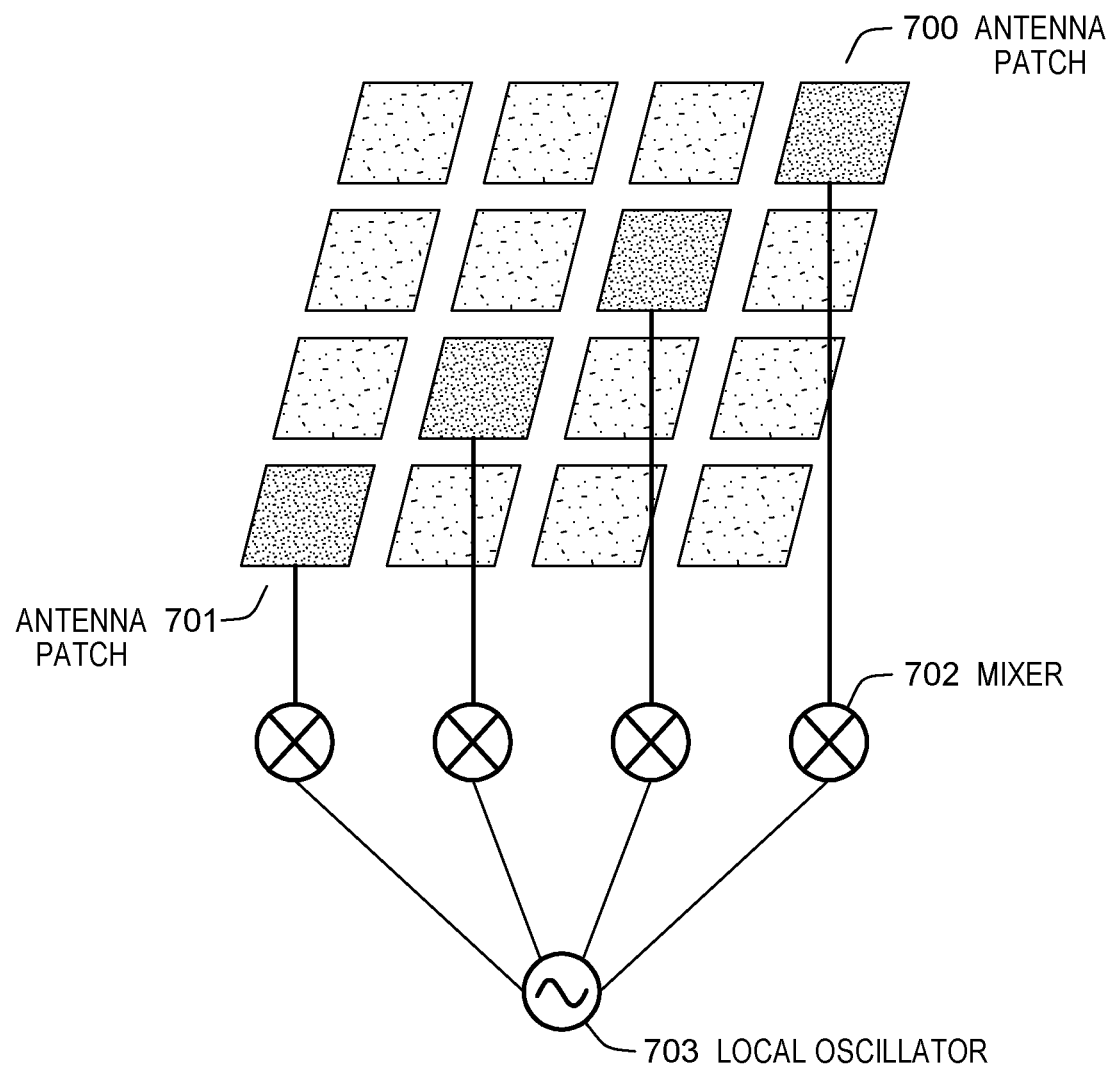
FIG. 7 is a functional block diagram illustrating an exemplary scenario, in accordance with an embodiment of the present invention.

In an alternate active van Atta embodiment is shown in FIG. 7 in which each antenna patch (701 antenna patch 700 and 701) of the van Atta array is connected via a mixer 702 to local oscillator 703. FIG. 7 Depicts an example of an active van Atta type retro directive array showing phase conjugating connections between antenna patches. This results in phase conjugation and re-emission of a retro directed wave front. Local oscillator 703 frequency is typically chosen to be two times the frequency of interest ($f_{lo}=2*f_{rf}$).

FIG. 7 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 7 provides only an illustration of one implementation and does not imply any limitations with regard to the environments in which different embodiments may be implemented. Many modifications to the depicted environment may be made by those skilled in the art without departing from the scope of the invention as recited by the claims.

FIG. 8 illustrates operational steps of component 122, generally designated 800, in communication with server computer 120, within distributed data processing environment 100 of FIG. 1A, for remotely detecting and identifying objects through orbital synthetic aperture radar satellites, in accordance with an embodiment of the present invention. FIG. 4 provides an illustration of one implementation and does not imply any limitations with regard to the environments in which different embodiments may be implemented. Many modifications to the depicted environment may be made by those skilled in the art without departing from the scope of the invention as recited by the claims.

In step 802, component 122 arranges an array of elements. In various embodiments, component 122 outputs instructions on how to arrange an array of elements or dynamically arranges the array of elements based on received feedback or user input. In some embodiments, the array of elements are arranged in a predetermined pattern or configuration.

In step 804, component 122 ingests radar data files for a region of interest. In various embodiments, component 122 ingests one or more radar VV, VH, HV and HH data files (e.g., images) containing a region of interest.

In step 806, component 122 processes images to detect and locate peaks in data. In various embodiments, component 122 processes ingested data files (e.g., images) to locate and create a list of peak features in the data.

In step 808, component 122 processes peaks using threshold and signature analysis. In various embodiments, component 122 process the detected and/or located peak features using threshold and signature analysis to generate a list of object detections. In various embodiments, component 122 transforms feature location to latitude, longitude coordinates for each detected and/or located peak. Further, component 122 may process the feature list to exclude peak data below one or more predetermined thresholds as background in both phase and amplitude and may process the peak locations in multiple polarization images to determine the polarization ratio to create a list of probable object detections.

In step 810, component 122 identifies an object based on amplitude, polarization ratio, and polarization phase difference. In various embodiments, component 122 identifies and/or classifies an object based on amplitude, polarization ratio, and polarization phase difference. Further, component 122 may classify the detected object in the list according to the polarization ratio and actions performed in step 808.

In step 812, component 122 outputs a list of probable object detections. In various embodiments, component 122 generate and outputs, via interface 106, a list of probable object detections with position coordinates and identifications, wherein the list of probable objects are above or within a predetermine threshold of confidence. In some embodiments, component 122 outputs an identified object, wherein the identified object is above or within a predetermine threshold of confidence.

Figure 9:
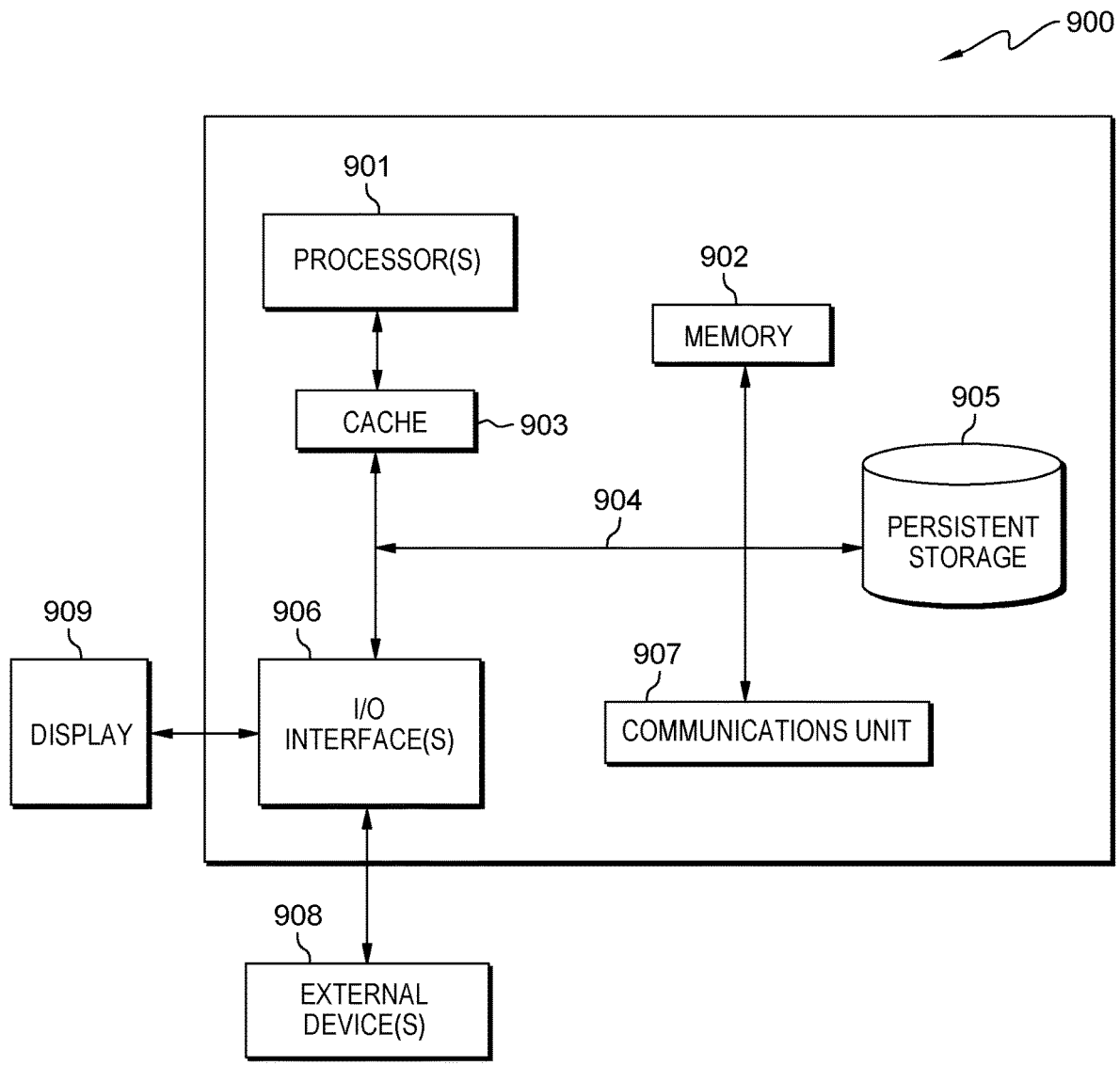
FIG. 9 depicts a block diagram of components of the server computer executing the image processing component within the distributed data processing environment of FIG. 1A, in accordance with an embodiment of the present invention.

FIG. 9 depicts a block diagram of components of server computer 120 within distributed data processing environment 100 of FIG. 1A, in accordance with an embodiment of the present invention. It should be appreciated that FIG. 9 provides only an illustration of one implementation and does not imply any limitations with regard to the environments in which different embodiments may be implemented. Many modifications to the depicted environment may be made.

FIG. 9 depicts computer system 900, where server computing 120 represents an example of computer system 900 that includes component 122. The computer system includes processors 901, cache 903, memory 902, persistent storage 905, communications unit 907, input/output (I/O) interface(s) 906, display 909, external device(s) 908 and communications fabric 904. Communications fabric 904 provides communications between cache 903, memory 902, persistent storage 905, communications unit 907, and input/output (I/O) interface(s) 906. Communications fabric 904 may be implemented with any architecture designed for passing data and/or control information between processors (such as microprocessors, communications, and network processors, etc.), system memory, peripheral devices, and any other hardware components within a system. For example, communications fabric 904 may be implemented with one or more buses or a crossbar switch.

Memory 902 and persistent storage 905 are computer readable storage media. In this embodiment, memory 902 includes random access memory (RAM). In general, memory 902 may include any suitable volatile or non-volatile computer readable storage media. Cache 903 is a fast memory that enhances the performance of processors 901 by holding recently accessed data, and data near recently accessed data, from memory 902.

Program instructions and data used to practice embodiments of the present invention may be stored in persistent storage 905 and in memory 902 for execution by one or more of the respective processors 901 via cache 903. In an embodiment, persistent storage 905 includes a magnetic hard disk drive. Alternatively, or in addition to a magnetic hard disk drive, persistent storage 905 may include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 905 may also be removable. For example, a removable hard drive may be used for persistent storage 905. Other examples include optical and magnetic disks, thumb drives, and smart cards that are inserted into a drive for transfer onto another computer readable storage medium that is also part of persistent storage 905.

Communications unit 907, in these examples, provides for communications with other data processing systems or devices. In these examples, communications unit 907 includes one or more network interface cards. Communications unit 907 may provide communications through the use of either or both physical and wireless communications links. Program instructions and data used to practice embodiments of the present invention may be downloaded to persistent storage 905 through communications unit 907.

I/O interface(s) 906 enables for input and output of data with other devices that may be connected to each computer system. For example, I/O interface 906 may provide a connection to external devices 908 such as a keyboard, keypad, a touch screen, and/or some other suitable input device. External devices 908 may also include portable computer readable storage media such as, for example, thumb drives, portable optical or magnetic disks, and memory cards. Software and data used to practice embodiments of the present invention may be stored on such portable computer readable storage media and may be loaded onto persistent storage 905 via I/O interface(s) 906. I/O interface(s) 906 also connect to display 909.

Display 909 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium may be any tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for remotely detecting and identifying objects through an orbital synthetic aperture radar satellite system, the computer-implemented method comprising:
   processing, by a threshold and signature analysis, detected peaks in image data received from the orbital synthetic aperture radar satellite system of an object having an array of elements in a predetermined configuration;
   generating a list of objects detections based on the processed peaks;
   identifying the object based on amplitude, polarization ratio, and polarization phase difference of the image data;
   classifying the identified object based on the generated list of objects; and
   outputting, by a user interface, a list of probable object detections with position coordinates and identifications based on the classified identified objects, wherein the list of probable objects are above or within a predetermine threshold of confidence.

2. The computer-implemented method of claim 1, further comprising:
   outputting instructions on how to arrange the array of elements or dynamically arrange the array of elements based on received feedback or user input.

3. The computer-implemented method of claim 1, further comprising:
   Ingesting radar files for a region of interest, wherein the radar files comprise: horizontal transmit and horizontal receive (HH), vertical transmit and vertical receive (VV), horizontal transmit and vertical receive (HV), and vertical transmit and horizontal receive (VH) data files.

4. The computer-implemented method of claim 1, further comprising:
   processing images to detect and locate peaks in data based on ingested radar files.

5. The computer-implemented method of claim 4, further comprising:
   creating a list of detected peaks and peak features of the ingested radar files; and
   outputting, by the user interface, the list of detected peaks and peak features of the ingested radar files.

6. The computer-implemented method of claim 1, further comprising:
   transforming detected or located peak feature location into latitude and longitude coordinates.

7. The computer-implemented method of claim 1, further comprising:
   processing a detected or located feature list to exclude peak data below one or more predetermined thresholds as background in both phase and amplitude.

8. A computer system for remotely detecting and identifying objects through an orbital synthetic aperture radar satellite system, the computer system comprising:
   one or more computer processors;
   one or more computer readable storage devices;
   program instructions stored on the one or more computer readable storage devices for execution by at least one of the one or more computer processors, the stored program instructions comprising:
      program instructions to process, by a threshold and signature analysis, detected peaks in image data received from the orbital synthetic aperture radar satellite system of an object having an array of elements in a predetermined configuration;
      program instructions to generate a list of objects detections based on the processed peaks;
      program instructions to identify the object based on amplitude, polarization ratio, and polarization phase difference of the image data;
      program instructions to classify the identified object based on the generated list of objects; and
      program instructions to output, by a user interface, a list of probable object detections with position coordinates and identifications based on the classified identified objects, wherein the list of probable objects are above or within a predetermine threshold of confidence.

9. The computer system of claim 8, further comprising:
   program instructions to output instructions on how to arrange the array of elements or dynamically arrange the array of elements based on received feedback or user input.

10. The computer system of claim 8, further comprising:
    program instructions to ingesting radar files for a region of interest, wherein the radar files comprise: horizontal transmit and horizontal receive (HH), vertical transmit and vertical receive (VV), horizontal transmit and vertical receive (HV), and vertical transmit and horizontal receive (VH) data files.

11. The computer system of claim 8, further comprising:
    program instructions to process images to detect and locate peaks in data based on ingested radar files.

12. The computer system of claim 11, further comprising:
    program instructions to create a list of detected peaks and peak features of the ingested radar files; and
    program instructions to output, by the user interface, the list of detected peaks and peak features of the ingested radar files.

13. The computer system of claim 8, further comprising:
    program instructions to transform detected or located peak feature location into latitude and longitude coordinates.

14. The computer system of claim 8, further comprising:
program instructions to process a detected or located feature list to exclude peak data below one or more predetermined thresholds as background in both phase and amplitude.

15. An apparatus for remotely detecting and identifying objects through an orbital synthetic aperture radar satellite system, the apparatus comprising:
a radar retro directive assembly (RDA) arranged as an array of elements affixed to an object that modifies the amplitude and phase of a retro directed signal from a synthetic aperture radar (SAR) system such that identification of the object is possible in synthetic aperture radar images using an image processing algorithm, wherein the apparatus comprises:
one or more computer readable storage devices and program instructions stored on the one or more computer readable storage devices, the stored program instructions comprising:
program instructions to process, by a threshold and signature analysis, detected peaks in image data received from the orbital synthetic aperture radar satellite system of an object having an array of elements in a predetermined configuration;
program instructions to generate a list of objects detections based on the processed peaks;
program instructions to identify the object based on amplitude, polarization ratio, and polarization phase difference of the image data;
program instructions to classify the identified object based on the generated list of objects; and
program instructions to output, by a user interface, a list of probable object detections with position coordinates and identifications based on the classified identified objects, wherein the list of probable objects are above or within a predetermine threshold of confidence.

16. The apparatus of claim 15, further comprising:
program instructions to output instructions on how to arrange the array of elements or dynamically arrange the array of elements based on received feedback or user input.

17. The apparatus of claim 15, further comprising:
program instructions to ingesting radar files for a region of interest, wherein the radar files comprise: horizontal transmit and horizontal receive (HH), vertical transmit and vertical receive (VV), horizontal transmit and vertical receive (HV), and vertical transmit and horizontal receive (VH) data files.

18. The apparatus of claim 15, further comprising:
program instructions to process images to detect and locate peaks in data based on ingested radar files;
program instructions to create a list of detected peaks and peak features of the ingested radar files; and
program instructions to output, by the user interface, the list of detected peaks and peak features of the ingested radar files.

19. The apparatus of claim 15, further comprising:
program instructions to transform detected or located peak feature location into latitude and longitude coordinates.

20. The apparatus of claim 15, further comprising:
program instructions to process a detected or located feature list to exclude peak data below one or more predetermined thresholds as background in both phase and amplitude.

* * * * *